United States Patent
Hu et al.

(10) Patent No.: US 12,307,467 B2
(45) Date of Patent: May 20, 2025

(54) METHOD FOR TRACKING CARBON FLOW OF POWER SYSTEM, DEVICE AND MEDIUM

(71) Applicants: NORTH CHINA ELECTRIC POWER UNIVERSITY, Beijing (CN); STATE GRID LIAONING ELECTRIC POWER SUPPLY CO., LTD., Dalian (CN)

(72) Inventors: Bo Hu, Dalian (CN); Gangjun Gong, Beijing (CN); Jiaxuan Yang, Beijing (CN); Wanli Cui, Dalian (CN); Jichao Dong, Dalian (CN); Jun Lu, Beijing (CN); Xu Zhang, Beijing (CN); Chunhua Lin, Dalian (CN); Zongle Ma, Dalian (CN); Ren Qiang, Beijing (CN); Li Liu, Beijing (CN); Qiguo Zhang, Dalian (CN); Xin Wu, Beijing (CN); Jiuliang Liu, Dalian (CN); Luyao Wang, Beijing (CN); Luning Jiang, Dalian (CN); Yurui Wang, Dalian (CN); Chang Su, Beijing (CN); Qiang Fang, Dalian (CN); Ao Yu, Dalian (CN); Yutong Wang, Dalian (CN); Shengjie Zhou, Dalian (CN); Meinan Lin, Dalian (CN); Linan Feng, Dalian (CN); Yilin Liu, Dalian (CN); Qiang Zhang, Dalian (CN)

(73) Assignees: NORTH CHINA ELECTRIC POWER UNIVERSITY, Beijing (CN); STATE GRID LIAONING ELECTRIC POWER SUPPLY CO., LTD., Dalian (CN)

( * ) Notice: Subject to any disclaimer, the term of this patent is extended or adjusted under 35 U.S.C. 154(b) by 0 days.

(21) Appl. No.: 18/916,667

(22) Filed: Oct. 15, 2024

(65) Prior Publication Data

US 2025/0131452 A1    Apr. 24, 2025

(30) Foreign Application Priority Data

Oct. 19, 2023   (CN) .......................... 202311353796.4

(51) Int. Cl.
  *G06Q 30/018*   (2023.01)
  *G06Q 50/06*    (2024.01)

(52) U.S. Cl.
  CPC ........... *G06Q 30/018* (2013.01); *G06Q 50/06* (2013.01)

(58) Field of Classification Search
  CPC ............................. G06Q 30/018; G06Q 50/06
  See application file for complete search history.

(56) References Cited

U.S. PATENT DOCUMENTS

2022/0327529 A1*  10/2022  Williams ............. G06Q 20/065

FOREIGN PATENT DOCUMENTS

| CN | 112215621 A | * | 1/2021 | ........... G06Q 20/065 |
| CN | 115941206 A | * | 4/2023 | |
| CN | 116861154 A | * | 10/2023 | |

* cited by examiner

*Primary Examiner* — Shelby A Turner
*Assistant Examiner* — Xiuqin Sun

(57) ABSTRACT

Provided are a method for tracking carbon flow of a power system, a device and a medium. The method includes: acquiring related data of carbon flow tracking, where the related data include an injected active power sum column matrix of generator sets of all substations to be tracked, an injected carbon flow rate sum column matrix of generator sets of all substations to be tracked, an output power distribution matrix of a branch formed between substations to be tracked, and a power flow proportion distribution matrix of the branch formed between substations to be tracked; acquiring a carbon potential matrix $E_N$ of each substation to be tracked; and acquiring a carbon flow rate of each substation to be tracked, a carbon flow rate of the branch, and a carbon flow rate of an output load on the basis of the carbon potential matrix of each substation to be tracked.

10 Claims, 5 Drawing Sheets

— 1 —

METHOD FOR TRACKING CARBON FLOW OF POWER SYSTEM, DEVICE AND MEDIUM

TECHNICAL FIELD

The present disclosure relates to the technical field of device rescue, and particularly provides a method for tracking carbon flow of a power system, a device and a medium.

BACKGROUND

A power system is the main source of carbon emission in China, facing unprecedented pressure of carbon reduction. In order to realize carbon peaking and carbon neutrality goals, it is urgent to develop low-carbon electric power, and it is particularly important to carry out carbon flow tracking. Carbon flow tracking methods mainly include macro statistics and carbon flow analysis. The macro statistics is based on the total consumption in a period of time, which leads to certain lag of carbon flow tracking results. However, the carbon flow analysis based on power distribution can clearly reveal the distribution, transmission and consumption characteristics of carbon flow in the power system on the basis of power flow results and carbon emission intensity of generator sets, so as to realize accurate tracking of a specific flow direction of carbon emission. However, since the electric power industry is one of the important pillar industries of the national economy related to the national economy and the people's livelihood, it is also very important to ensure data of the power system in the process on the basis of the accuracy of carbon flow tracking results.

SUMMARY

In order to overcome the above defects, the present disclosure is provided, so as to solve or at least partially solve the problem of low accuracy of carbon flow tracking.

At a first aspect, the present disclosure provides a method for tracking carbon flow of a power system. The method includes: acquiring related data of carbon flow tracking, where the related data include an injected active power sum column matrix $P_G$ of generator sets of all substations to be tracked, an injected carbon flow rate sum column matrix $R_G$ of generator sets of all substations to be tracked, an output power distribution matrix $P'_B$ of a branch formed between substations to be tracked, and a power flow proportion distribution matrix $S_r$ of the branch formed between substations to be tracked;

acquiring a carbon potential matrix $E_N$ of each substation to be tracked on the basis of the related data; and acquiring a carbon flow rate of each substation to be tracked, a carbon flow rate of the branch, and a carbon flow rate of an output load on the basis of the carbon potential matrix $E_N$ of each substation to be tracked.

In one technical solution of the above method for tracking carbon flow of a power system, prior to acquiring related data of carbon flow tracking, the method includes: constructing a master-slave multi-chain architecture on the basis of all the substations to be tracked and generator sets in the substations to be tracked in the power system, where the master-slave multi-chain architecture includes a master chain constructed by taking all the substations to be tracked as master chain nodes, a plurality of slave chains constructed by taking injected and output loads of generator sets of the substations to be tracked as slave chain nodes, a dispatching center, several master chain power flow blocks and several slave chain blocks; and constructing smart contracts.

In one technical solution of the above method for tracking carbon flow of a power system, the constructing smart contracts includes:

setting preset triggering conditions and preset rules corresponding thereto; and constructing smart contracts on the basis of the preset triggering condition and the preset rules corresponding thereto, where the smart contracts include smart contract 1, smart contract 2, smart contract 3, smart contract 4, and smart contract 5.

For smart contract 1 and smart contract 2, the preset triggering condition of smart contract 1 is condition a, and the condition a is to determine whether the dispatching center constructs an injected carbon flow rate sum column matrix $R_G$ of generator sets. Preset rule a is: to respond to that a is to calculate the sum $R_{Gj}$ of injected active power on the basis of the master chain node, and upload same to the dispatching center.

The preset triggering condition of smart contract 2 is condition b, where condition b is that the dispatching center constructs an output power distribution matrix $P'_B$ of a branch, and a power flow proportion distribution matrix $S_r$ of the branch. Preset rule b is: to respond to that b is to construct $P'_B$ and the power flow proportion distribution matrix $S_r$ of the branch through a network topology structure on the basis of the master chain node, and upload same to the dispatching center.

The preset triggering condition of smart contract 3 is condition c, and condition c is to calculate the carbon flow rate of the master chain node by the master chain node. Preset rule c is: to respond to that c is to calculate the carbon flow rate of each master chain node on the basis of the master chain node.

The preset triggering condition of smart contract 4 is condition d, and condition d is to calculate a carbon flow rate of the branch connected to the master chain node by the master chain node. Preset rule d is: to respond to that d is to calculate carbon flow rates at a head end of an output branch and at a tail end of an input branch of the master chain node on the basis of the master chain node, and calculate a carbon flow rate of a transmission loss of the branch connected to each master chain node.

The preset triggering condition of smart contract 5 is condition e, and condition e is to calculate a carbon flow rate of an output load of the master chain node. Preset rule e is: to calculate a carbon flow rate of the output load on the basis of the output load of the master chain node.

In one technical solution of the above method for tracking carbon flow of a power system, the acquiring a carbon potential matrix $E_N$ of each substation to be tracked on the basis of the related data includes:

uploading the related data to the dispatching center through the master chain node; and calculating a carbon potential matrix $E_N$ of each substation to be tracked on the basis of the related data through the dispatching center.

In one technical solution of the above method for tracking carbon flow of a power system, the acquiring a carbon flow rate of each substation to be tracked, a carbon flow rate of the branch, and a carbon flow rate of an output load on the basis of the carbon potential matrix $E_N$ of each substation to be tracked includes:

acquiring carbon potential of each master chain node on the basis of the carbon potential matrix $E_N$ of each substation to be tracked;

acquiring a carbon flow rate of the master chain node, i.e. the carbon flow rate of each substation to be tracked on the basis of the carbon potential of each master chain node and smart contract 3;

acquiring a carbon flow rates of the branch on the basis of the carbon potential of each master chain node and smart contract 4; and acquiring a carbon flow rate of an output load on the basis of the carbon potential of each master chain node and smart contract 5.

In one technical solution of the above method for tracking carbon flow of a power system, the constructing a master-slave multi-chain architecture on the basis of all the substations to be tracked and the generator sets in the substations to be tracked in the power system at least includes: packing the sum of injected active power of the generator sets, the active power of the substations to be tracked, and the associated active power corresponding to the substations recorded according to the branches between the substations and the connected substations into the master chain power flow block, where a block header of the master chain power flow block includes a traditional block header, an injection value, a load number and an attribute degree, the injection value is the number of injection generator sets in the substation, the load number is the number of output loads of the substation, and the attribute degree is a sequence value of the power flow of the substation in the whole power system; and packing the injected active power, the injected carbon flow rate and the carbon emission intensity of the generator set into the slave chain block, where a block header of the slave chain block includes a traditional block header and a mark value, the mark value is used for distinguishing a generator set node from an output load node, and the mark value includes mark value 1 and mark value 0.

In one technical solution of the above method for tracking carbon flow of a power system, the acquiring related data of carbon flow tracking further includes:

sequentially arranging attribute degrees of master chain nodes from small to large through the dispatching center to form an injected active power column matrix $P_G$ of generator sets of all substations to be tracked, an injected carbon flow rate column matrix $R_G$ of generator sets of all substations to be tracked, an output power distribution matrix $P'_B$ of a branch formed between substations to be tracked, and a power flow proportion distribution matrix $S_r$ of the branch formed between substations to be tracked.

At a second aspect, the present disclosure provides a device. The device includes a processor and a storage apparatus, where the storage apparatus is adapted to store a plurality of program codes, and the program codes are adapted to be loaded and run by the processor to implement the above method for tracking carbon flow of a power system described in one of the technical solutions of the method for tracking carbon flow of a power system.

At a third aspect, the present disclosure provides a computer-readable storage medium, which stores a plurality of program codes, where the program codes are adapted to be loaded and run by a processor to implement the above method for tracking carbon flow of a power system described in one of the technical solutions of the method for tracking carbon flow of a power system.

One or more of the above-mentioned technical solutions of the present disclosure at least has one or more of the following beneficial effects:

Compared with the prior art, the method for tracking carbon flow of a power system provided by the present disclosure has the beneficial effects: the concept of a carbon potential matrix is introduced in the method, and the carbon potential matrix of each substation to be tracked is acquired on the basis of the related data. The carbon potential matrix can reflect carbon flow potential and distribution inside the substation and among the branches. Then, on the basis of the carbon potential matrix, the method can accurately calculate the carbon flow rate of each substation to be tracked, the carbon flow rate of the branch and the carbon flow rate of the output load. These results can more accurately reflect a path and contribution of carbon emission, thereby providing an important basis for formulating a carbon emission reduction strategy.

Furthermore, a blockchain not only has tamper-proof characteristics, but also has a network topology similar to that of the power system. Therefore, this method also applies the blockchain technology to carbon flow tracking of the power system, provides a credible and fair carbon flow tracking environment, ensures the data ownership right of a data owner and the data use right of a data demander, and effectively improves security protection of the whole process of data sharing of the power system. Moreover, the smart contract as one of blockchain technologies is further utilized to automatically trigger execution when constraint conditions are satisfied, thereby realizing the autonomous property of related calculations or operations. According to the method, data security of the power system is guaranteed by combining the blockchain of the master-slave multi-chain architecture, carbon flow analysis is utilized to obtain the carbon potential matrix $E_N$ of the substation, and the carbon flow rates of the substation, the branch and the output load are finally obtained through the smart contracts, such that safety, accuracy and high efficiency of carbon flow tracking of the power system are realized. Specifically, power flow of the power system is informationalized by the master-slave multi-chain architecture using the blockchain, and a power flow alliance chain is built for the substation which bears the responsibility for electric energy circulation in the power system and serves as the master chain, so as to realize win-win results of data security and calculation efficiency in the carbon flow tracking process. The output power distribution matrix of the branch and the power flow proportion distribution matrix of the branch are obtained through power conservation conditions of carbon flow analysis, the carbon potential matrix of the substation is obtained by combining carbon emission flow based on power flow of active power with the calculation method for the carbon flow rate, and elements in the matrix are correspondingly sent to corresponding master chain nodes, so as to provide data basis for calculation of related carbon flow rates and ensure correctness of carbon flow tracking results. In addition, different smart contracts are employed to be responsible for the construction of the injected carbon flow rate sum matrix of the generator sets of the master chain node, the output power distribution matrix of the branch, and the power flow proportion distribution matrix of the branch, and the carbon flow rates of the substation, the branch and the output load are calculated correspondingly through different smart contracts, so as to improve the autonomous efficiency of carbon flow tracking.

BRIEF DESCRIPTION OF THE DRAWINGS

Referring to the accompanying drawings, disclosed contents of the present disclosure will become more comprehensible. It should be understood by those skilled in the art that these accompanying drawings are only used for explanation and are not intended to limit the protection scope of the present disclosure. In addition, similar numerals in the figures are used for referring to similar parts, where.

DETAILED DESCRIPTION OF THE EMBODIMENTS

Some implementations of the present disclosure are described below with reference to the accompanying drawings. It should be understood by those skilled in the art that these implementations are only used for explaining technical principles of the present disclosure and are not intended to limit the protection scope of the present disclosure.

Embodiment 1

Figure 1:
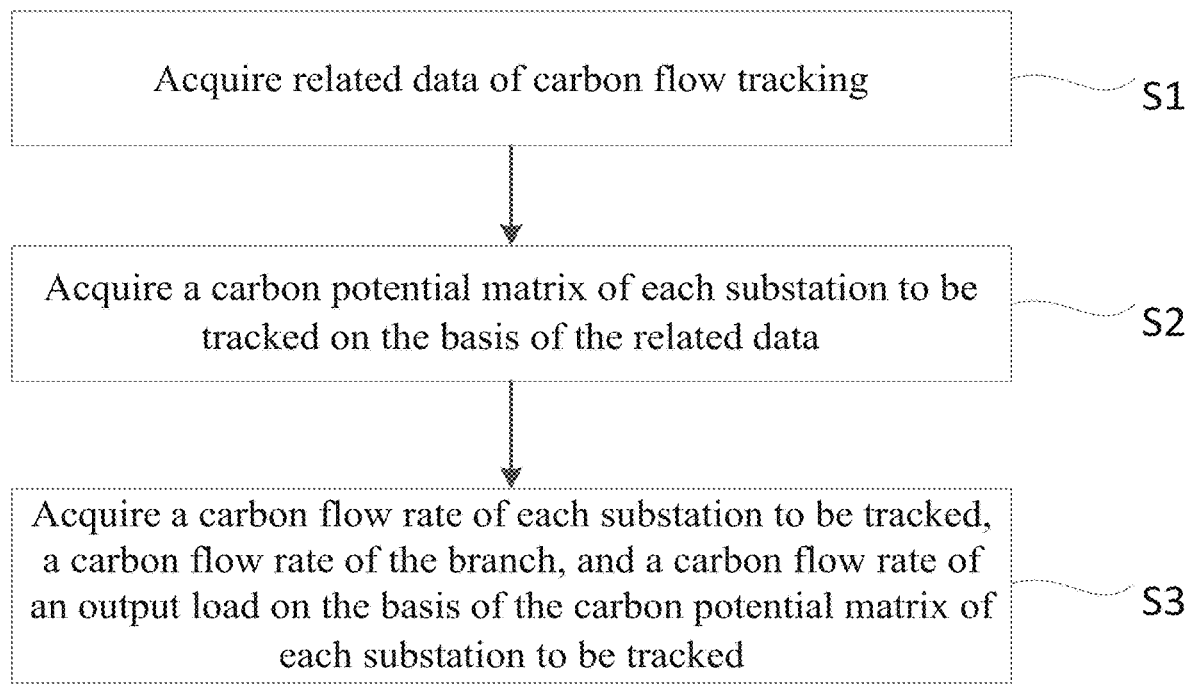
FIG. 1 is a flow diagram of main steps of a method for tracking carbon flow of a power system in an embodiment of the present disclosure.

As shown in FIG. 1, a method for tracking carbon flow of a power system in the embodiment of the present disclosure mainly include the following steps S1-S3.

The present disclosure provides a method for tracking carbon flow of a power system. The method includes the following steps:

Step S1, acquire related data of carbon flow tracking, where the related data include an injected active power sum column matrix $P_G$ of generator sets of all substations to be tracked, an injected carbon flow rate sum column matrix $R_G$ of generator sets of all substations to be tracked, an output power distribution matrix $P'_B$ of a branch formed between substations to be tracked, and a power flow proportion distribution matrix $S_r$ of the branch formed between substations to be tracked.

In this embodiment, the step of acquiring related data of carbon flow tracking is to comprehensively understand the carbon emission situation in the power system. Specifically, the injected active power sum column matrix of generator sets of all substations to be tracked is acquired so as to calculate the sum of injected active power of generator sets in each substation to be tracked. The injected carbon flow rate sum column matrix of generator sets of all substations to be tracked is acquired so as to calculate the sum of injected carbon flow rates of generator sets in each substation to be tracked. The carbon flow rate is an index for measuring the carbon emission degree of the power system, and the carbon emission situation of each substation can be obtained by calculating the sum of the injected carbon flow rates. The output power distribution matrix of a branch formed between substations to be tracked is obtained, the data describe the output power distribution of each substation on the branch, the electric energy flow and distribution on the branch has an important influence on carbon flow tracking, and a path and contribution of carbon flow can be inferred by analyzing the output power distribution. The power flow proportion distribution matrix of the branch formed between the substations to be tracked is obtained, and the data represent the power flow proportion distribution of each substation on the branch. The obtained power flow proportion can be used for inferring the distribution of the carbon flow, which is of great significance to reflect a path and contribution of carbon emission.

Step S2, acquire a carbon potential matrix $E_N$ of each substation to be tracked on the basis of the related data.

In this embodiment, the carbon potential refers to the carbon emission amount of $CO_2$ (equivalent to carbon flow density of branch and carbon emission intensity of generator set) on a power generation side accompanied by unit active power of a substation when the system operates in a steady state, and the carbon potential matrix reflects the carbon flow situation in each substation to be tracked, which can be used for measuring the carbon emission situation of the substation.

Step S3, acquire a carbon flow rate of each substation to be tracked, a carbon flow rate of the branch, and a carbon flow rate of an output load on the basis of the carbon potential matrix $E_N$ of each substation to be tracked.

In this embodiment, the carbon flow rate is the $CO_2$ emission amount on a substation or branch in unit time, and the carbon flow rate of each substation to be tracked, the carbon flow rate of the branch and the carbon flow rate of the output load can be used for analyzing and evaluating the carbon emission situation in the power system, so as to help to reduce carbon emission and optimize the operation of the power system.

Figure 2:
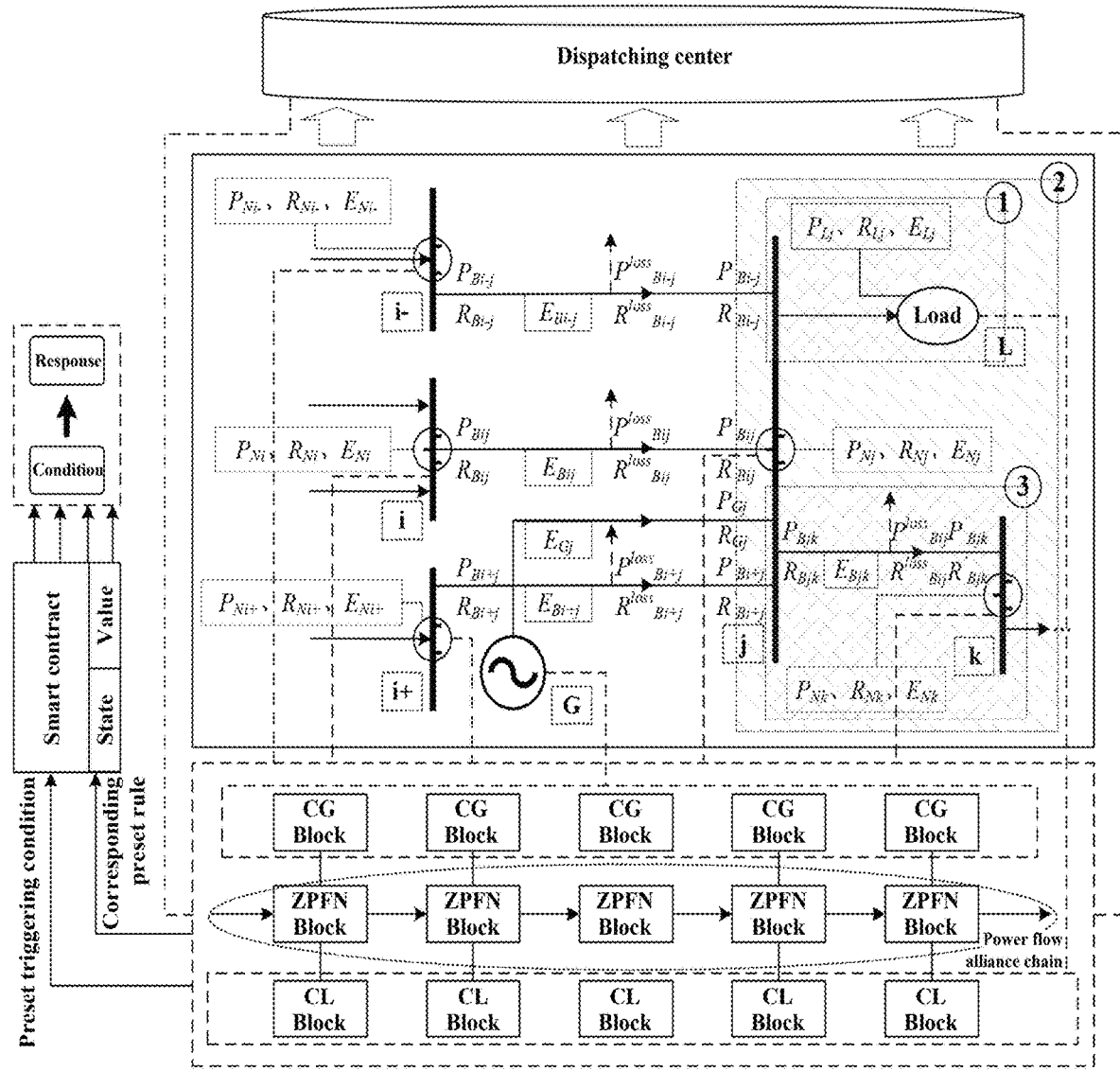
FIG. 2 is a schematic diagram of a master-slave multi-chain architecture in an embodiment of the present disclosure.

In one embodiment, prior to the step of step S1, acquiring related data of carbon flow tracking further includes:

construct a master-slave multi-chain architecture as shown in FIG. 2 on the basis of all the substations to be tracked and generator sets in the substations to be tracked in the power system, where the master-slave multi-chain architecture includes a master chain constructed by taking all the substations to be tracked as master chain nodes, a plurality of slave chains constructed by taking injected and output loads of generator sets of the substations to be tracked as slave chain nodes, a dispatching center, several master chain power flow blocks and several slave chain blocks; and construct smart contracts.

In this embodiment, i, j and k in FIG. 2 all represent the substations to be tracked. Firstly, a master-slave multi-chain architecture is constructed on the basis of all the substations to be tracked and the generator sets thereof in the power system. This architecture includes a master chain constructed by taking the substations to be tracked as master chain nodes to ensure efficient carbon flow tracking, and a plurality of slave chains constructed by taking injected and output loads of generator sets of the substations to be tracked as slave chain nodes. This architecture is constructed to facilitate tracking and management of data of the substations and the generator set. Secondly, the master-slave multi-chain architecture further includes a dispatching center, several master chain power flow blocks and several slave chain blocks. The dispatching center acts as a central control node responsible for coordinating and managing the operation and dispatch of the substation and the generator set. The master chain power flow block and the slave chain block are used for refining and dividing different levels of data management and operations.

Further, by defining the relevant parameters of the substation, the generator set, the branch and the output load, and then by combining power conservation condition of the carbon flow analysis, carbon emission flow based on power flow of active power, and related calculation methods for the carbon flow rates of the branch and the substation, a carbon potential matrix $E_N$ of the substation is acquired, and the carbon flow rates of the substation, the branch and the output load are calculated by combining different smart contracts, such that safety, accuracy and high efficiency of the carbon flow tracking of the power system are realized.

Specifically, the step of defining the relevant parameters of the substation, the generator set, the branch and the output load includes:

Description is made by taking substation j (j=1, 2, ..., n, n substations in total) as an example. Relevant parameters of substation j at least include active power $P_{Nj}$ of substation j, a carbon flow rate $R_{Nj}$ of substation j and carbon potential $E_{Nj}$ of substation j, and the relationship among the active powder, the carbon flow rate and the carbon potential is shown in Formula (1):

$$R_{Nj} = P_{Nj} \cdot E_{Nj} \tag{1}$$

The column matrix formed by the active power of each substation is $P_N=[P_{N1}\ P_{N2}\ \ldots\ P_{Nn}]^T \in R^{n \times 1}$, the column matrix formed by the carbon flow rate of each substation is $R_N=[R_{N1}\ R_{N2}\ \ldots\ R_{Nn}]^T \in R^{n \times 1}$, and the column matrix formed by the carbon potential of each substation is $E_N=[E_{N1}\ E_{N2}\ \ldots\ E_{Nn}]^T \in R^{n \times 1}$. The relationship among the three matrices is shown in Formula (2):

$$R_N = \mathrm{diag}(P_N) \cdot E_N \tag{2}$$

In the formula, $\mathrm{diag}(P_N)$ represents the diagonal matrix of the column matrix $P_N$ of the active power of each substation, and main diagonal elements are $R_{N1}, R_{N2}, \ldots, R_{Nn}$ in turn.

The related parameters of substation j also include: injected active power $P_{G_g j}$ of the gth generator set of substation j, an injected carbon flow rate $R_{G_g j}$ of the gth generator set of substation j, and carbon emission intensity $E_{G_g j}$ of the gth generator set of substation j, and the relationship among the active powder, the carbon flow rate and the carbon emission intensity is shown in Formula (3):

$$R_{G_g j} = P_{G_g j} \cdot E_{G_g j} \tag{3}$$

The sum $P_{Gj}$ of the injected active power of generator sets in substation j is shown in Formula (4):

$$P_{Gj} = \sum_{g \in W_j^+} P_{G_g j} \tag{4}$$

In the formula, $W_j^+$ represents the set of the generator sets directly connected to substation j and active power input, such that the column matrix formed by the sum of the injected active power of the generator sets of each substation is $P_G=[P_{G1}\ P_{G2}\ \ldots\ P_{Gn}] \in R^{n \times 1}$.

The sum $R_{Gj}$ of injected carbon flow rates of the generator sets in substation j is shown in formula (5):

$$R_{Gj} = \sum_{g \in W_j^+} P_{G_g j} \cdot E_{G_g j} \tag{5}$$

Therefore, the column matrix $R_G$ formed by the sum of the injected active power of the generator sets in each substation is: $R_G=[R_{G1}\ R_{G2}\ \ldots\ R_{Gn}] \in R^{n \times 1}$.

The carbon emission intensity $E_{Gj}=R_{Gj}/P_{Gj}$ of the generator sets of substation j, such that the column matrix formed by carbon emission intensity of the generator sets of each substation is: $E_G=[E_{G1}\ E_{G2}\ \ldots\ E_{Gn}] \in R^{n \times 1}$.

Branch i-j in FIG. 2 is taken as an example, and related parameters of the branch are $P_{Bij}$, $P'_{Bij}$, $P_{Bij}^{loss}$, $R_{Bij}$, $R'_{Bij}$, $R_{Bij}^{loss}$, and $E_{Bij}$.

$P_{Bij}$, $P'_{Bij}$ and $P_{Bij}^{loss}$ are active power of a head end, a tail end and a transmission loss of branch i-j respectively, and the relationship among the three kinds of active powder is shown in Formula (6):

$$P_{Bij}^{loss} = P_{Bij} - P'_{Bij} \tag{6}$$

The carbon potential of the substation at the head end of the branch is defined as a carbon flow density $E_{Bij}$ of the entire branch, as shown in Formula (7):

$$E_{Bij} = E_{Ni} \tag{7}$$

$R_{Bij}$, $R'_{Bij}$ and $R_{Bij}^{loss}$ are carbon flow rates of the head end, the tail end and the transmission loss of the branch i-j respectively, and the relationship among the three kinds of carbon flow rate is shown in Formula (8):

$$R_{Bij}^{loss} = R_{Bij} - R'_{Bij} \tag{8}$$

$E_{Bij}$ is the carbon flow density of the branch i-j, and the relationship between the carbon flow density and the active power and the carbon flow rate of the branch i-j is shown in Formula (9):

$$\begin{cases} R_{Bij} = P_{Bij} \cdot E_{Bij} = P_{Bij} \cdot E_{Ni} \\ R'_{Bij} = P'_{Bij} \cdot E_{Bij} = P'_{Bij} \cdot E_{Ni} \\ R_{Bij}^{loss} = P_{Bij}^{loss} \cdot E_{Bij} = P_{Bij}^{loss} \cdot E_{Ni} \end{cases} \tag{9}$$

Similarly, related parameters and mutual operation relations of branch j-k can be obtained. For example, $P_{Bjk}$ is the active power at the head end of the branch j-k, the carbon flow density of branch j-k is equal to the carbon potential $E_{Nj}$ of the substation j.

Related parameters of the output load are the lth active load $P_{Lj}$ of substation j, a carbon flow rate $R_{Lj}$ of the lth active load of substation j, and carbon potential $E_{Lj}$ of the lth active load of substation j. The relationship among the three parameters is shown in Formula (10):

$$R_{L_l j} = E_{L_l j} \cdot P_{L_l j} \tag{10}$$

The sum $P_{Lj}$ of all active loads of substation j is shown in Formula (11):

$$P_{Lj} = \sum_{l \in S_j^-} P_{L_l j} \qquad (11)$$

In the formula, $S_j^-$ is the load set directly connected to substation j and active power output.

If the output load is regarded as a branch output by the substation, the carbon potential of the output load is the same, that is $E_{L_l j} = E_{Nj}$, and $R_{L_l j}$ can be expressed by Formula (12):

$$R_{L_l j} = E_{Nj} \cdot P_{L_l j} \qquad (12)$$

Figure 4:
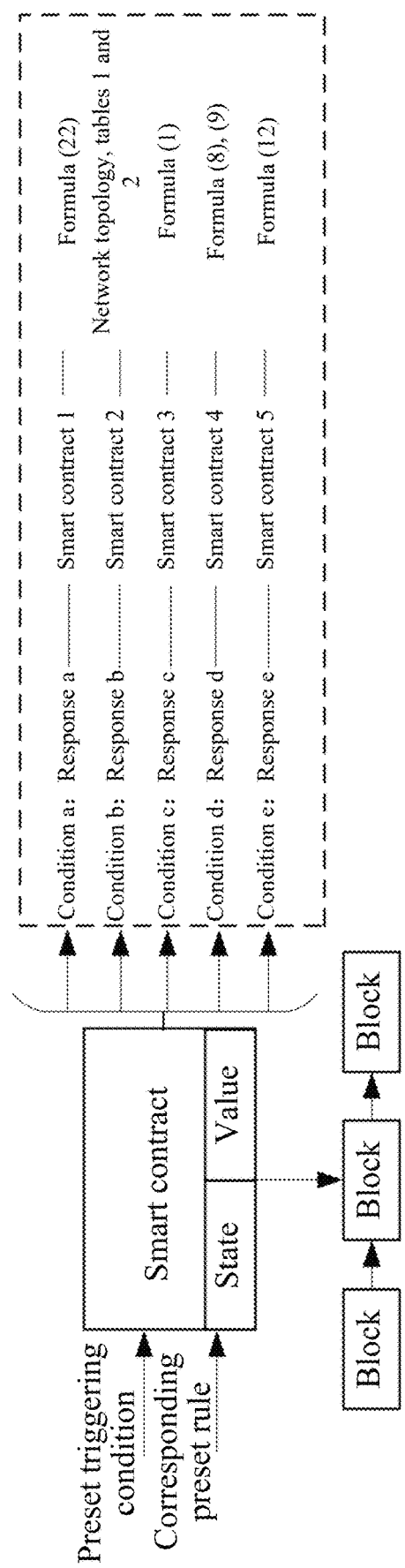
FIG. 4 shows a schematic diagram of composition of a smart contract in an embodiment of the present disclosure.

In an embodiment, the step of constructing smart contracts includes:
 set preset triggering conditions and preset rules corresponding thereto; and
 construct smart contracts on the basis of the preset triggering condition and the preset rules corresponding thereto, where the smart contracts include smart contract 1, smart contract 2, smart contract 3, smart contract 4, and smart contract 5 as shown in FIG. 4.

For smart contract 1 and smart contract 2, the preset triggering condition of smart contract 1 is condition a, and the condition a is to determine whether the dispatching center constructs an injected carbon flow rate sum column matrix $R_G$ of generator sets. Preset rule a is: to respond to that a is to calculate the sum $R_{Gj}$ of injected active power on the basis of the master chain node, and upload same to the dispatching center.

The preset triggering condition of smart contract 2 is condition b, where condition b is that the dispatching center constructs an output power distribution matrix $P'_B$ of a branch, and a power flow proportion distribution matrix $S_r$ of the branch. Preset rule b is: to respond to that b is to construct $P'_B$ and the power flow proportion distribution matrix $S_r$ of the branch through a network topology structure on the basis of the master chain node, and upload same to the dispatching center.

The preset triggering condition of smart contract 3 is condition c, and condition c is to calculate the carbon flow rate of the master chain node by the master chain node. Preset rule c is: to respond to that c is to calculate the carbon flow rate of each master chain node on the basis of the master chain node.

The preset triggering condition of smart contract 4 is condition d, and condition d is to calculate a carbon flow rate of the branch connected to the master chain node by the master chain node. Preset rule d is: to respond to that d is to calculate carbon flow rates at a head end of an output branch and at a tail end of an input branch of the master chain node on the basis of the master chain node, and calculate a carbon flow rate of a transmission loss of the branch connected to each master chain node.

The preset triggering condition of smart contract 5 is condition e, and condition e is to calculate a carbon flow rate of an output load of the master chain node. Preset rule e is: to calculate a carbon flow rate of the output load on the basis of the output load of the master chain node.

In this embodiment, firstly, through the smart contracts, automated and trustless transactions and execution logic can be realized. This allows participants to execute contracts without third party intervention and ensures accurate execution of contracts. Secondly, the smart contracts can automate transactions without involvement of third party institutions, thus reducing the transaction cost. Thirdly, the smart contracts eliminate the need for intermediaries and middlemen, simplifying the transaction process and improving efficiency. In addition, the smart contracts are based on the blockchain technology, and all transactions and executions are recorded on a public ledger. This means that each participant can verify execution outcomes of the contracts and ensure that there is no tampering or cheating. The smart contracts based on the blockchain technology add credibility and transparency. Finally, execution of the smart contracts is jointly verified and documented by the nodes in the network, without the need for a single centralized authority to assume the role of trust, which makes the smart contracts safer and less vulnerable to manipulation and attack. That is, constructing smart contracts can realize automation, reduce the cost, increase credibility, and reduce dependence on third parties.

In one embodiment, the step of step S1, acquiring related data of carbon flow tracking at least includes:

Step S11, acquire a carbon traceability broadcast issued by the dispatching center in the whole chain.

Step S12, acquire, in response to the carbon traceability broadcast, the sum of injected active power of generator sets corresponding to the master chain node on the basis of each master chain node, and acquire an injected active power sum column matrix $P_G$ of generator sets of all substations to be tracked on the basis of the sum of injected active power of generator sets corresponding to the master chain node.

Step S13, acquire, on the basis of each master chain node and smart contract 1, the sum of injected carbon flow rates of generator sets corresponding to the master chain node, acquire the sum of injected carbon flow rates of generator sets corresponding to the master chain node on the basis of each master chain node, and acquire an injected carbon flow rate column matrix $R_G$ of generator sets of all substations to be tracked.

Step S14, acquire, on the basis of smart contract 2 and all output branches of each master chain node, an output power distribution matrix $P'_B$ of a branch formed between substations to be tracked, and a power flow proportion distribution matrix $S_r$ of a branch formed between substations to be tracked.

In this embodiment, the dispatching center is a central control node of a carbon flow tracking system, and will issue the carbon traceability broadcast in the whole chain range. The carbon traceability broadcast is an information broadcast containing related data of carbon flow tracking that other nodes can receive and respond to. In response to the carbon traceability broadcast, the sum of the injected active power of generator sets corresponding to the master chain node is calculated and acquired. Each master chain node represents one substation to be tracked, and the substation includes multiple generator sets. By calculating the sum of the injected active power of generator sets, a column matrix can be obtained, which contains the sum of the injected active power of the generator sets of all substations to be tracked. Moreover, on the basis of smart contract 1, each maim chain node further acquire the sum of injected active power of generator sets corresponding to the master chain node. By calculating the sum of injected carbon flow rates of the column matrix of generator sets, another column matrix can be obtained, and this matrix includes the sum of the injected carbon flow rates of the generator sets of all the substations to be tracked. On the basis of smart contract 2 and all output branches of each master chain node, an output power distribution matrix and a power flow proportion distribution matrix of the branch formed between substations to be tracked are obtained, and these matrices describe the output power and the power flow distribution situations of the branches formed between substations to be tracked. Through the above steps, various related data of carbon flow tracking can be obtained, and these data are very important for carbon flow tracking and analysis, which can help monitor and manage the carbon emission situation and optimize operation and scheduling of the power system.

In one embodiment, the step of step S2, acquiring a carbon potential matrix $E_N$ of each substation to be tracked on the basis of the related data includes:

step S21, upload the related data to the dispatching center through the master chain node; and step S22, calculate a carbon potential matrix $E_N$ of each substation to be tracked on the basis of the related data through the dispatching center.

In this embodiment, the dispatching center, as the management center of the power system, has a higher level of computing and dispatching capabilities. By uploading the data to the dispatching center, the data scattered in each master chain node can be integrated, and more complex and comprehensive calculations and analysis can be carried out by utilizing the computing capability of the dispatching center. The carbon potential matrix of the substation to be tracked needs to comprehensively consider the relationship between the substations, the power flow situation of the branch, the power distribution and other information to calculate a global carbon emission situation. Such computational work requires a greater computing capability and a global perspective, and the dispatching center can provide such a capability. In addition, uploading the data to the dispatching center can also achieve centralized management and monitoring, which facilitates real-time analysis and decision-making. The dispatching center can carry out real-time monitoring and analysis according to the uploaded data, timely discover problems and take corresponding measures to optimize system operation and carbon emission control. Therefore, the purpose of uploading the data to the dispatching center for calculation is to utilize the centralized management and computing capabilities, so as to realize more comprehensive, accurate and efficient calculation and management of the carbon potential matrix.

Specifically, in the method, the carbon flow rates of the substation, the branch and the output load are calculated by using the carbon potential matrix $E_N$ of the substation to be tracked in carbon flow analysis, and the carbon potential of the substation and the generator sets which inject active power are associated with the input branches, so the active power of the substation can be decomposed and converted into two matrix forms $P1_N$ and $P2_N$ by combining power conservation conditions. Then, the carbon flow rate matrices $R1_N$ and $R2_N$ corresponding to $P1_N$ and $P2_N$ are obtained by utilizing the carbon emission flow based on power flow of active power, and calculation methods for the carbon flow rates of the branch and the substation. Finally, the carbon potential matrix $E_N$ of the substation to be tracked is obtained.

Step 1: the active power of the substation is decomposed and converted into a matrix form.

It can be known from the power conservation conditions that the total output power, the total inflow power and the active power of the substation are equal, so the active power $P_{Nj}$ of substation j can be expressed as formula (13):

$$P_{Nj} = \sum_{i \in X_j^+} P'_{Bij} + P_{Gj} \quad (13)$$

In the formula, $P'_{Bij}$ represents the active power of the tail end of branch i-j, $X_j^+$ represents the set of the generator sets directly connected to substation j and upstream substation with active power input, and $P_{Gj}$ represents the sum of the injected active power of the generator sets.

Further, Formula (13) can be converted into two matrix forms ($P1_N = P2_N = P_N$): $P1_N = [P'_B{}^T P_G] \cdot \lambda_{((n+1)\times 1)}$ (form 1) and $P2_N = (S_r^T)^{inv} \cdot P_G$ (form 2).

Form 1:

$$P1_N = [P'_B{}^T \ P_G] \cdot \lambda_{((n+1)\times 1)} \quad (14)$$

In the formula, $\lambda_{(n+1)\times 1} = [1 \ \ldots \ 1] \in R^{(n+1)\times 1}$ represents a column vector of dimension (n+1).

$P_G = [P_{G1} \ P_{G2} \ldots P_{Gn}] \in R^{n\times 1}$ represents the column matrix formed by the sum of injected active power of generator sets of each substation. $P'_B \in R^{n\times n}$ Represents a distribution matrix formed by the output power of the branch. Element distribution (substation i flowing to substation j) is as follows:

TABLE 1

| Distribution of values of $P_B'$ | |
| --- | --- |
| Condition 1/condition 3 | Condition 2 |
| $P_{Bij}' = 0$ | $P_{Bij}' = q$ |

Notes:
Condition 1: i = j.
Condition 2: Substation i and substation j are directly connected, and the active power input is q (branch i − j exists, and the active power input to the tail substation is q).
Condition 3: There is no branch directly connected between substation i and substation j.

Form 2:

Formula (13) is rewritten as subtraction, as shown in Formula (15):

$$P_{Nj} - \sum_{i \in X_j^+} \frac{P'_{Bij}}{P_i} P_i = P_{Gj} \quad (15)$$

Therefore, the relationship between the column matrix $P_N$ of the active power of each substation and the column matrix $P_G$ of the injected active power of the generator sets of each substation can be established through the distribution matrix $S_r$ formed by the branch power flow proportion, that is:

$$S_r \cdot P2_N = P_G \quad (16)$$

In the formula, element distribution of the distribution matrix $S_r$ of the branch power flow is as follows:

TABLE 2

Distribution of values of $S_r$

| Condition 1 | Condition 2 | Condition 3 |
|---|---|---|
| $(S_r)_{ji} = 1$ | $(S_r)_{ji} = -\dfrac{q}{P_{Ni}}$ | $(S_r)_{ji} = 0$ |

Notes:
Condition 1: i = j.
Condition 2: Substation i and substation j are directly connected, and the active power input is q (branch i − j exists, and the active power input to the tail substation is q).
Condition 3: There is no branch directly connected between substation i and substation j. Therefore, the second matrix form of expression of $P_N$ is Formula (17), and inv represents inverting the matrix.

$$P2_N = (S_r)^{inv} \cdot P_G \tag{17}$$

Step 2: The carbon flow rate matrices $R1_N$ and $R2_N$, and the carbon potential matrix $E_N$ of the substation are acquired.

Since the carbon emission flow is based on the power flow of active power, the following formula can be obtained according to formula (18):

$$R_{Nj} = \sum_{i \in X_j^+} R'_{Bij} + R_{Gj} \tag{18}$$

According to Formulas (9), (14) and (18), new form 1 of $R_N$ is as follows:

$$R1_N = P'^T_B \cdot E_N + R_G \tag{19}$$

According to Formulas (2) and (17), new form 2 of $R_N$ is as follows:

$$R2_N = \text{diag}\left((S_r)^{inv} \cdot P_G\right) \cdot E_N \tag{20}$$

According to Formulas (19) and (20), the carbon potential column matrix $E_N$ of each substation can be obtained shown as follows:

$$E_N = \left(\text{diag}\left((S_r)^{inv} \cdot P_G\right) - P'^T_B\right)^{inv} \cdot R_G \tag{21}$$

In one embodiment, the step of step S3, acquiring a carbon flow rate of each substation to be tracked, a carbon flow rate of the branch, and a carbon flow rate of an output load on the basis of the carbon potential matrix $E_N$ of each substation to be tracked includes:

Step S31, acquire carbon potential of each master chain node on the basis of the carbon potential matrix $E_N$ of each substation to be tracked.

In this embodiment, the carbon potential represents the carbon emission amount of the substation, which is obtained through calculation. Each substation serves as a master chain node and has a corresponding carbon potential value.

Step S32, acquire a carbon flow rate of the master chain node, i.e. the carbon flow rate of each substation to be tracked on the basis of the carbon potential of each master chain node and smart contract 3.

In this embodiment, the carbon flow rate represents the carbon emission amount of the master chain node in unit time, and the carbon flow rate of each substation to be tracked can be calculated by combining the carbon potential of the master chain node through a calculation program of smart contract 3.

Step S33, acquire carbon flow rates of the branch on the basis of the carbon potential of each master chain node and smart contract 4.

In this embodiment, the carbon flow rate of the branch represents the carbon emission amount of the branch participating in the operation of the system. Through a calculation program of smart contract 4, combined with the carbon potential of the master chain node, the carbon flow rate of each branch in the system can be calculated and obtained.

Step S34, acquire a carbon flow rate of an output load on the basis of the carbon potential of each master chain node and smart contract 5.

In this embodiment, the carbon flow rate of the output load represents the carbon emission amount when the power system supplies a given load demand. Through a calculation program of smart contract 5, combined with the carbon potential of the master chain node, the carbon flow rate of the output load can be calculated and obtained.

Since the active power or active load has been linked up and stored in the corresponding block, it can be known that calculation of the carbon flow rate of the substation, the branch and the load only needs the carbon potential to which the substation, the branch and the load belong by combining with (1), (8), (9) and (12) in step 1, such that the carbon flow rate of the substation, the branch and the output load can be obtained by applying for obtaining the carbon potential issued by the dispatching center to each master chain node and calculating in combination with smart contracts 3, 4 and 5. According to Formula (21), it can be seen that the premise of obtaining $E_N$ by the dispatching center through calculation is to construct the injected active power sum column matrix $P_G$ of generator sets of each master chain node, an injected carbon flow rate sum column matrix $R_G$ of generator sets of each master chain node, the output power distribution matrix $P'_B$ of the branch, and the power flow proportion distribution matrix $S_r$ of the branch. Therefore, the patent of the present disclosure lays a data foundation through the construction of $R_G$, $P'_B$ and $S_r$ through the first two of smart contracts, and calculates the carbon flow rate of the substation, the branch and the output load through the last three of the smart contracts.

In one embodiment, the step of constructing a master-slave multi-chain architecture on the basis of all the substations to be tracked and generator sets in the substations to be tracked in the power system at least includes: pack the sum of injected active power of the generator sets, the active power of the substations to be tracked, and the associated active power corresponding to the substations recorded according to the branches between the substations and the connected substations into the master chain power flow block.

Specifically, the branches include an output branch and an input branch. In the power system, the output branch is usually connected to loads or customers and is responsible for providing electrical energy to the customers. Therefore, nodes in the output branch provide references to voltages and frequencies of the system, similar to the role of the head node, and are therefore referred to as head node roles. In contrast, the input branch is usually connected to a power supply or a supply point of the power system and is responsible for transferring electrical energy from the power supply to the power system. Nodes of the input branches usually do not provide independent voltage and frequency references, but depend on a voltage and a frequency of the power supply, and therefore is called tail node roles. In addition, the role of the head node and the role of the tail node are relative. In a particular power system part or subsystem, a certain node can be the head node of an output branch, but it can also be the tail node of an input branch, which depends on the structure and the connection mode of the power system. To sum up, the output branches usually have the head node roles because they provide voltage and frequency references, while the input branches usually have the tail node roles because they depend on the voltage and frequency of the power supply. This distinction is intended to facilitate modeling and analysis of the power system, and control and manage stable operation of the power system.

Correlative active power refers to three active power values of the branch between substations: active power at the head end of the branch, active power at the tail end of the branch, and active power of a transmission loss of the branch. The attribute degree of the substation at the head end of the branch remains corresponding to the active power at the head end of the branch, and the attribute degree of the substation at the tail end of the branch remains corresponding to the active power at the tail end of the branch and the active power of the transmission loss of the branch. As shown in FIG. 2, for example, substation j plays the role of the head node in branch j-k, so the attribute degree of substation j remains corresponding to the active power $P_{Bjk}$ at the head end of branch j-k, whereas substation j plays the role of the tail node in branch i-j, so the attribute degree of substation j remains corresponding to the active power $P'_{Bij}$ at the tail end of branch i-j. Because the input branches and the output branches of the substation are complex and multiple, in order to make clear which input branch the active power flowing in the substation comes from and which output branch the active power flowing out of the substation flows to, the method stores the attribute degree of the substation itself in the block header. When the substation acts as the role of the tail node, the substation block stores the active power at the tail end of the branch, the active power of the transmission loss of the branch and the attribute degree of the substation at the head end of the branch. When the substation acts as the role of the head node in the output branch, the substation block stores the active power at the head end of the branch and the attribute degree of the substation at the tail end of the branch. The carbon potential of the substation is calculated by the dispatching center and sent to substation after substation is uplinked, such that the master chain power flow block can be updated and has its own carbon potential.

Further, the nodes at the head end and the tail end of the branch are uplinked to different data respectively. Distribution rules are as follows: the head node corresponds to the active power at the head end of the branch, the tail node corresponds to the active power at the tail end of the branch and the active power of the transmission loss of the branch, the dispatching center is responsible for the calculation of the transmitted data after the substation is uplinked, and related data are not required to be uplinked later.

Figure 3:
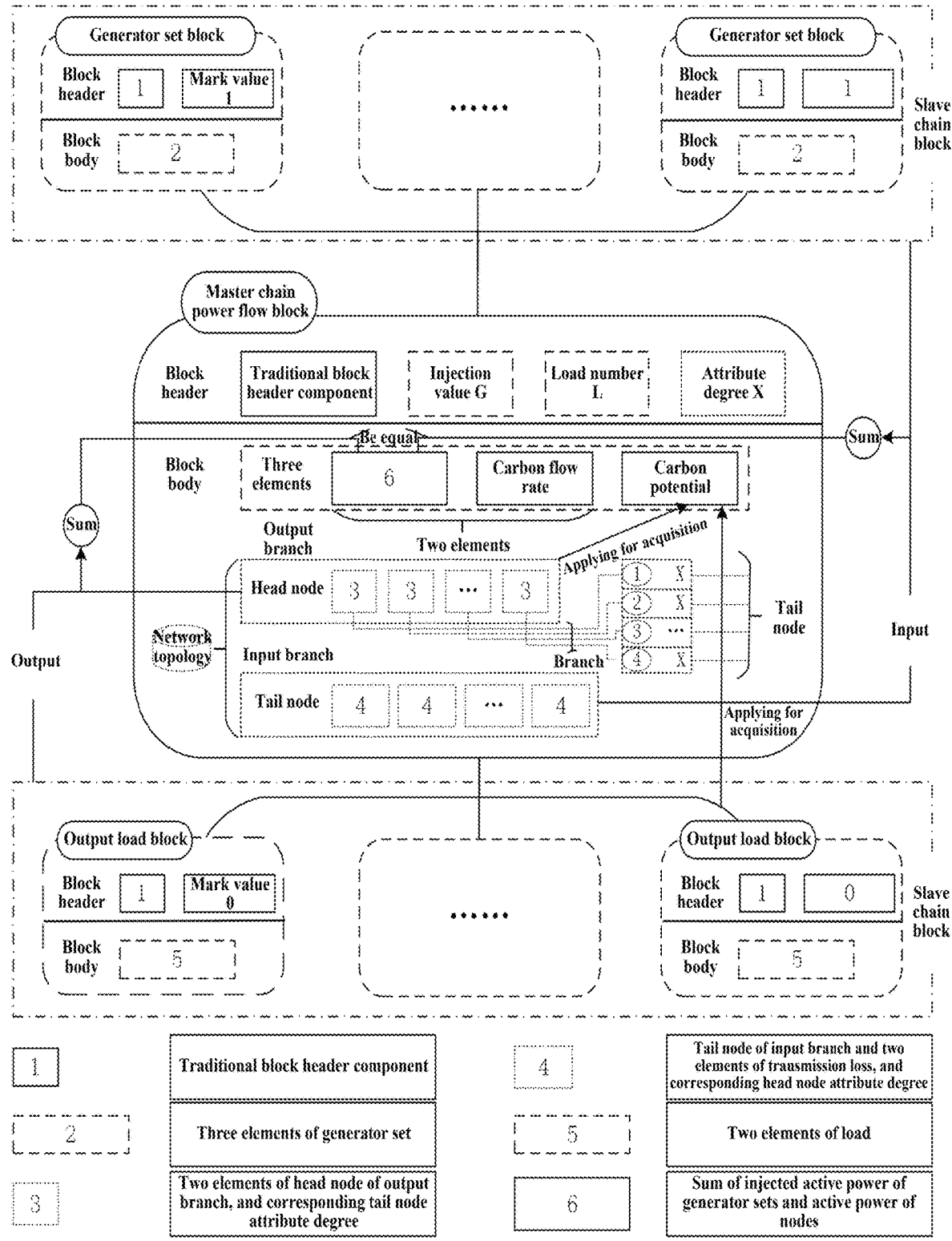
FIG. 3 is a schematic structural diagram of master and slave chain node blocks in an embodiment of the present disclosure.

Further, as shown in FIG. 3, the block header of the master chain power flow block includes a traditional block header, an injection value G, a load number L and an attribute degree X, the injection value is the number of injection generator sets in the substation, the load number is the number of output loads of the substation, and the attribute degree is a sequence value of the power flow of the substation in the whole power system.

Specifically, a block body of the master chain power flow block includes three elements of an engine set, the sum of injected active power of generator sets, node active power, a carbon flow rate and carbon potential, and the three elements of the engine set include injected active power, an injected carbon flow rate and carbon emission intensity. The attribute degree is the sequence value of the power flow of the substation in the whole power system (power flow direction being from left to right, and the number being increased in turn).

The injected active power, the injected carbon flow rate and the carbon emission intensity of the generator set are packed into the slave chain block. The gth generator set of the substation j is taken as an example, the injected active power $P_{G_{gj}}$ of the generator set and the carbon emission intensity $E_{G_{gj}}$ of the generator set need to be uploaded, and the injected carbon flow rate $R_{G_{gj}}$ of the generator set can be calculated and obtained through Formula (3). For uplinking of output load data, the output load packs the active load into the slave chain block (the lth active load $P_{L_{lj}}$ of substation j). The relevant injected active power and carbon emission intensity of the generator set can be directly obtained, and the carbon flow rate needs to be calculated. This calculation is to generate blocks by uplinking these three pieces of data after the offline calculation of the generator set is completed.

Further, as shown in FIG. 3, a block header of the slave chain block includes a traditional block header and a mark value, the mark value is used for distinguishing a generator set node from an output load node, and the mark value is a sign bit, and is composed of (1, 0): 1 indicates that the slave chain node is the generator set node, so the slave chain node block body is the three elements of the generator set; and 0 indicates that the slave chain node is the output load node.

Specifically, the slave chain block include several generator set blocks, and the generator set block includes a first block header and a first block body. The first block header at least includes a traditional block header and a mark value 1. The first block body includes three element of an engine set, and several output load modules. The output load module includes a second block header and a second block body. The second block header includes a traditional block header, and a mark value 0. The second block body is of two elements of load, and the two elements of load are an active load and a carbon flow rate.

Further, for the consensus of uplinking of the block, the master and slave chain nodes need to obtain authorization approval from different nodes. Specific allocation is as follows: the master chain node corresponds to all the master chain nodes input and output by itself, and the slave chain node corresponds to all the master chain nodes injected by itself or input.

Further, the head node of the output branch, the tail node of the input branch, and two elements of transmission loss are active power and a carbon flow rate.

In one embodiment, the step of acquiring related data of carbon flow tracking further includes:
sequentially arrange attribute degrees of master chain nodes from small to large through the dispatching center to form the injected active power column matrix $P_G$ of generator sets of all substations to be tracked, the injected carbon flow rate column matrix $R_G$ of generator sets of all substations to be tracked, the output power distribution matrix $P'_B$ of the branch formed between substations to be tracked, and the power flow proportion distribution matrix $S_r$ of the branch formed between substations to be tracked.

Figure 5:
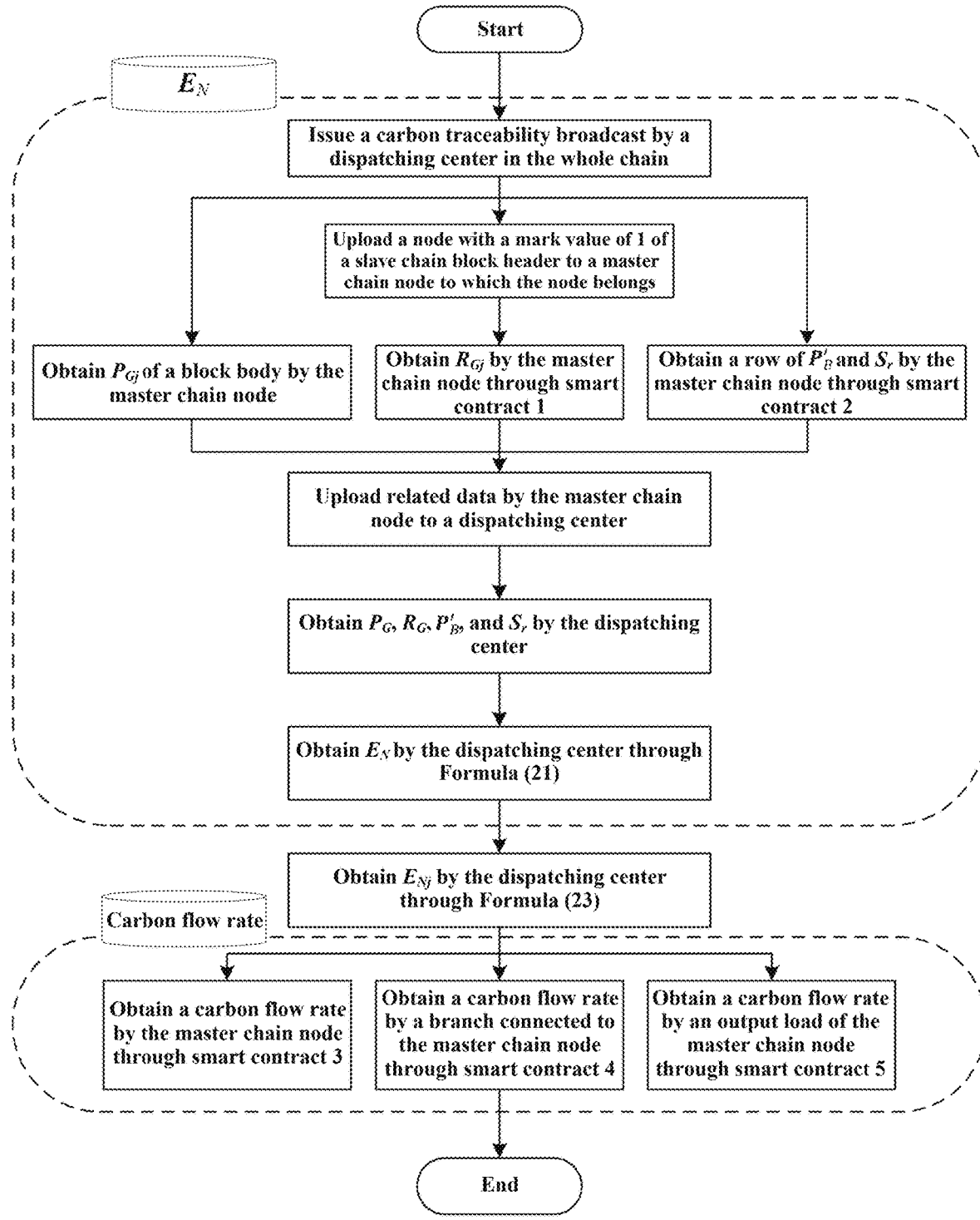
FIG. 5 is a logic diagram of a carbon flow rate calculation process in an embodiment of the present disclosure.

Referring to FIG. 5, a possible control flow for the present disclosure is introduced below. FIG. 5 is a logic diagram of a carbon flow rate calculation process of the present disclosure.

As shown in FIG. 5, step 1: carbon flow rate calculation is started.

Step 2: a carbon flow tracking broadcast is issued in the whole chain by the dispatching center, and respective responsible parts are started to be executed by the master chain nodes and the slave chain nodes.

Step 3: firstly, an injected active power sum column matrix $P_G$ of the generator sets of each master chain node is constructed, and the sum ($P_{Gj}$) of injected active power of the generator sets is obtained in the block body by the master chain node.

Step 4: secondly, an injected carbon flow rate sum column matrix $R_G$ of the generator sets of each master chain node is constructed, and an injected carbon flow rate ($R_{G_gj}$) of the node with the mark value of 1 of the slave chain block header is uploaded, namely the node of the slave chain generator set node to the master chain node to which the injected carbon flow rate belongs.

Step 5: then, an output power distribution matrix $P'_B$ of the branch and a power flow proportion distribution matrix $S_r$ of the branch are calculated. Under the scenario that the master chain node i is the head node of the output branch, the tail node (master chain node j) corresponding to the output branch is obtained through a network topology structure of smart contract 2, and the attribute degree is transmitted to the tail node. The master chain node j transmits the active power q and a ratio of the active power q to the active power $P_{Ni}$ serving as the tail node of the input branch to the master chain node i according to the attribute degree of the head node. The master chain node i receives the transferred data of the master chain nodes to which all output branch tail nodes belong and forms the ith row of $P'_B$ and the ith column of $S_r$ respectively through Tables 1 and 2 of smart contract 2 (the master chain node i has multiple output branches and thus has different tail nodes, so it needs to receive data of all the output branch tail nodes. Moreover, the tail nodes will also receive active power from different input branches, so the tail nodes need to transmit the active power data received under the input branches where the master chain node i is located to the master chain node i.)

Step 6: the master chain node adds the carbon flow rate through Formula (22) of smart contract 1, so as to calculate the sum $R_{Gj}$ of the injected active power of the master chain node.

$$R_{Gj} = \sum_{g \in W_j^+} R_{G_gj} \quad (22)$$

Step 7: a certain row of $P_{Gj}$ of all the master chain nodes in step 3, $R_{G_gj}$ of all the master chain nodes in step 4, and $P'_B$ and $S_r$ formed by all the master chain nodes formed in step 5 are uploaded to the dispatching center.

Step 8: the dispatching center arranges attribute degrees of the master chain nodes from small to large to form matrices $P_G$ (step 3), $R_G$ (step 4), $P'_B$ (step 5), and $S_r$ (step 5).

Step 9: the dispatching center calculates and obtain the carbon potential matrix of the master chain node according to Formula (21), namely the carbon potential matrix $E_N$ of the substation.

Step 10: the dispatching center data $E_{Nj}$ transmits to the corresponding master chain node through Formula (23) after $E_N$ is obtained by the dispatching center, where The carbon potential $E_{Nj}$ of the master chain node j is expressed as:

$$E_{Nj} = e_j^T \cdot E_N \quad (23)$$

In the formula, $e_j^T \in R^{1 \times n}$ represents a row matrix with the jth component being 1 and the rest being 0.

Step 11: the carbon flow rate of the master chain node may be obtained according to the carbon potential $E_{Nj}$ of the master chain node j, and the carbon flow rate of the master chain node may be obtained through Formula (1) of smart contract 5 after the master chain node receives and stores the carbon potential of the master chain node.

Step 12: the carbon flow rate at the head end or the tail end of he connected branch can be obtained according to the carbon potential $E_{Nj}$ of the master chain node j, the master chain node i acting as the role of the head node applies for acquiring the carbon potential of the master chain node i, and the carbon flow rate at the head end of different output branch with the master chain node i as the head node can be obtained through Formula (9) of the smart contract. The master chain node j acting as the role of the tail node applies to different head nodes for acquiring carbon flow densities of different branches (i.e. the carbon potential of the master chain node to which the head node belongs), and the carbon flow rates of the tail ends of different input branches with the master chain node j as the tail node can be obtained through Formula (9) of the smart contract. The carbon flow rate of the transmission loss of the branch can be calculated and obtained through Formula (8) of the smart contract.

Step 13: the carbon flow rate of the output load can be obtained according to the carbon potential $E_{Nj}$ of the master chain node j, the output load node of the slave chain applies for acquiring the carbon potential from the master chain node to which the output load node belongs, and the carbon flow rate of the output load is calculated and obtained through Formula (12) of the smart contract.

Step 14: the carbon flow rate calculation is ended.

Embodiment 2

The present disclosure further provides a device. In a device embodiment according to the present disclosure, the device includes a processor and a storage apparatus. The storage apparatus may be configured to store a program for executing the method for tracking carbon flow of a power system in the above method embodiment, and the processor may be configured to execute the program in the storage apparatus. The program includes but not limited to the program for executing the method for tracking carbon flow of a power system in the above method embodiment. For convenience of explanation, only the parts related to the embodiments of the present disclosure are shown. For specific technical details not disclosed, please refer to the method part of the embodiments of the present disclosure.

Embodiment 3

The present disclosure further provides a computer-readable storage medium. In an embodiment of the computer-readable storage medium according to the present disclosure, the computer-readable storage medium may be configured to store a program for executing the method for tracking carbon flow of a power system in the above method embodiment, and this program may be loaded and run by a processor to implement the above method for tracking carbon flow of a power system. For convenience of explanation, only the parts related to the embodiments of the present disclosure are shown. For specific technical details not disclosed, please refer to the method part of the embodiments of the present disclosure. The computer-readable storage medium may be of a storage apparatus device formed by including various electronic devices. Optionally, the computer-readable storage medium in the embodiment of the present disclosure is a non-transitory computer-readable storage medium.

Heretofore, the technical solutions of the present disclosure have been described in conjunction with the preferred implementations shown in the accompanying drawings. However, those skilled in the art can readily understand that the protection scope of the present disclosure is obviously not limited to these specific implementations. Without departing from the principles of the present disclosure, those skilled in the art may make equivalent changes or substitutions to related technical features, and technical solutions obtained after these changes or substitutions will fall within the protection scope of the present disclosure.

What is claimed is:

1. A method for tracking carbon flow of a power system, comprising:
    acquiring related data of carbon flow tracking, wherein the related data comprise an injected active power sum column matrix $P_G$ of generator sets of all substations to be tracked, an injected carbon flow rate sum column matrix $R_G$ of generator sets of all substations to be tracked, an output power distribution matrix $P'_B$ of a branch formed between substations to be tracked, and a power flow proportion distribution matrix $S_r$ of the branch formed between substations to be tracked;
    acquiring a carbon potential matrix $E_N$ of each substation to be tracked on the basis of the related data; and
    acquiring a carbon flow rate of each substation to be tracked, a carbon flow rate of the branch, and a carbon flow rate of an output load on the basis of the carbon potential matrix $E_N$ of each substation to be tracked;
    wherein prior to acquiring related data of carbon flow tracking, the method comprises:
        constructing a master-slave multi-chain architecture on the basis of all the substations to be tracked and generator sets in the substations to be tracked in the power system, wherein the master-slave multi-chain architecture comprises a master chain constructed by taking all the substations to be tracked as master chain nodes, a plurality of slave chains constructed by taking injected and output loads by the generator sets of the substations to be tracked as slave chain nodes, a dispatching center, several master chain power flow blocks and several slave chain blocks; and
        constructing smart contracts;
    wherein the constructing smart contracts comprises:
        setting preset triggering conditions and preset rules corresponding thereto;
        constructing smart contracts on the basis of the preset triggering condition and the preset rules corresponding thereto, wherein the smart contracts comprise smart contract 1, smart contract 2, smart contract 3, smart contract 4, and smart contract 5;
        for smart contract 1 and smart contract 2, the preset triggering condition of smart contract 1 is condition a, and the condition a is to determine whether the dispatching center constructs an injected carbon flow rate sum column matrix $R_G$ of generator sets; preset rule a is: to respond to that a is to calculate the sum $R_{Gj}$ of injected active power on the basis of the master chain node, and upload same to the dispatching center;
        the preset triggering condition of smart contract 2 is condition b, wherein condition b is that the dispatching center constructs an output power distribution matrix $P'_B$ of a branch, and a power flow proportion distribution matrix $S_r$ of the branch; preset rule b is: to respond to that b is to construct $P'_B$ and the power flow proportion distribution matrix $S_r$ of the branch through a network topology structure on the basis of the master chain node, and upload same to the dispatching center;
        the preset triggering condition of smart contract 3 is condition c, and condition c is to calculate the carbon flow rate of the master chain node by the master chain node; preset rule c is: to respond to that c is to calculate the carbon flow rate of each master chain node on the basis of the master chain node;
        the preset triggering condition of smart contract 4 is condition d, and condition d is to calculate a carbon flow rate of the branch connected to the master chain node by the master chain node; preset rule d is: to respond to that d is to calculate carbon flow rates at a head end of an output branch and at a tail end of an input branch of the master chain node on the basis of the master chain node, and calculate a carbon flow rate of a transmission loss of the branch connected to each master chain node;
        the preset triggering condition of smart contract 5 is condition e, and condition e is to calculate a carbon flow rate of an output load of the master chain node; and preset rule e is: to calculate a carbon flow rate of the output load on the basis of the output load of the master chain node; and
    wherein the method further comprises:
        determining, based on the carbon flow rate of each substation to be tracked, the carbon flow rate of the branch, and the carbon flow rate of the output load, a path and contributions of carbon emission of the all substations to be tracked; and
        controlling, based on the path and the contributions of carbon emission of the all substations to be tracked, a target substation of the all substations to be tracked to reduce carbon emission.

2. The method according to claim 1, wherein the acquiring related data of carbon flow tracking at least comprises:
    acquiring a carbon traceability broadcast issued by the dispatching center in the whole chain;
    acquiring, in response to the carbon traceability broadcast, the sum of injected active power of generator sets corresponding to the master chain node on the basis of each master chain node, and acquiring an injected active power sum column matrix $P_G$ of generator sets of all substations to be tracked on the basis of the sum of injected active power of generator sets corresponding to the master chain node;
    acquiring, on the basis of each master chain node and smart contract 1, the sum of injected carbon flow rates of generator sets corresponding to the master chain node, acquiring the sum of injected carbon flow rates of generator sets corresponding to the master chain node on the basis of each master chain node, and acquiring an injected carbon flow rate column matrix $R_G$ of generator sets of all substations to be tracked; and acquiring, on the basis of smart contract 2 and all output branches of each master chain node, an output power distribution matrix $P'_B$ of a branch formed between substations to be tracked, and a power flow proportion distribution matrix $S_r$ of the branch formed between substations to be tracked.

3. The method according to claim 1, wherein the acquiring a carbon potential matrix $E_N$ of each substation to be tracked on the basis of the related data comprises:

uploading the related data to the dispatching center through the master chain node; and calculating a carbon potential matrix $E_N$ of each substation to be tracked on the basis of the related data through the dispatching center.

4. The method according to claim 3, wherein the acquiring a carbon flow rate of each substation to be tracked, a carbon flow rate of the branch, and a carbon flow rate of an output load on the basis of the carbon potential matrix $E_N$ of each substation to be tracked comprises:

acquiring carbon potential of each master chain node on the basis of the carbon potential matrix $E_N$ of each substation to be tracked;

acquiring a carbon flow rate of the master chain node, i.e. the carbon flow rate of each substation to be tracked on the basis of the carbon potential of each master chain node and smart contract 3;

acquiring a carbon flow rate of the branch on the basis of the carbon potential of each master chain node and smart contract 4; and acquiring a carbon flow rate of an output load on the basis of the carbon potential of each master chain node and smart contract 5.

5. The method according to claim 1, wherein the constructing a master-slave multi-chain architecture on the basis of all the substations to be tracked and generator sets in the substations to be tracked in the power system at least comprises: packing the sum of injected active power of the generator sets, the active power of the substations to be tracked, and the associated active power corresponding to the substations recorded according to the branches between the substations and the connected substations into the master chain power flow block, wherein a block header of the master chain power flow block comprises a traditional block header, an injection value, a load number and an attribute degree, the injection value is the number of injection generator sets in the substation, the load number is the number of output loads of the substation, and the attribute degree is a sequence value of the power flow of the substation in the whole power system; and packing the injected active power, the injected carbon flow rate and the carbon emission intensity of the generator set into the slave chain block, wherein a block header of the slave chain block comprises a traditional block header and a mark value, the mark value is used for distinguishing a generator set node from an output load node, and the mark value comprises mark value 1 and mark value 0.

6. The method according to claim 5, wherein the acquiring related data of carbon flow tracking further comprises:

sequentially arranging attribute degrees of master chain nodes from small to large through the dispatching center to form an injected active power column matrix $P_G$ of generator sets of all substations to be tracked, an injected carbon flow rate column matrix $R_G$ of generator sets of all substations to be tracked, an output power distribution matrix $P'_B$ of a branch formed between substations to be tracked, and a power flow proportion distribution matrix $S_r$ of the branch formed between substations to be tracked.

7. An electronic device, comprising a processor and a storage apparatus, wherein the storage apparatus is adapted to store a plurality of program codes, and the program codes are adapted to be loaded and run by the processor to implement the method for tracking carbon flow of a power system according to claim 1.

8. A non-transitory computer-readable storage medium, storing a plurality of program codes, wherein the program codes are adapted to be loaded and run by a processor to implement the method for tracking carbon flow of a power system according to claim 1.

9. The method according to claim 1, wherein the controlling, based on the path and the contributions of carbon emission of the all substations to be tracked, a target substation of the all substations to be tracked to reduce carbon emission comprises:

controlling by the dispatching center, based on the path and the contributions of carbon emission of the all substations to be tracked, a target substation with a contribution of carbon emission greater than a target contribution, to reduce carbon emission of the target substation.

10. A method for tracking carbon flow of a power system, comprising:

acquiring related data of carbon flow tracking, wherein the related data comprise an injected active power sum column matrix $P_G$ of generator sets of all substations to be tracked, an injected carbon flow rate sum column matrix $R_G$ of generator sets of all substations to be tracked, an output power distribution matrix $P'_B$ of a branch formed between substations to be tracked, and a power flow proportion distribution matrix $S_r$ of the branch formed between substations to be tracked;

acquiring a carbon potential matrix $E_N$ of each substation to be tracked on the basis of the related data;

acquiring a carbon flow rate of each substation to be tracked, a carbon flow rate of the branch, and a carbon flow rate of an output load on the basis of the carbon potential matrix $E_N$ of each substation to be tracked, wherein the carbon flow rate of each substation to be tracked, the carbon flow rate of the branch, and the carbon flow rate of the output load together reflect a path and contributions of carbon emission of the all substations to be tracked; and controlling, by the dispatching center, based on the path and the contributions of carbon emission of the all substations to be tracked, at least one substation of the all substations to be tracked to reduce carbon emission of the at least one substation;

wherein prior to acquiring related data of carbon flow tracking, the method comprises:

constructing a master-slave multi-chain architecture on the basis of all the substations to be tracked and generator sets in the substations to be tracked in the power system, wherein the master-slave multi-chain architecture comprises a master chain constructed by taking all the substations to be tracked as master chain nodes, a plurality of slave chains constructed by taking injected and output loads by the generator sets of the substations to be tracked as slave chain nodes, a dispatching center, several master chain power flow blocks and several slave chain blocks; and constructing smart contracts;
wherein the constructing smart contracts comprises:
setting preset triggering conditions and preset rules corresponding thereto;
constructing smart contracts on the basis of the preset triggering condition and the preset rules corresponding thereto, wherein the smart contracts comprise smart contract 1, smart contract 2, smart contract 3, smart contract 4, and smart contract 5;
for smart contract 1 and smart contract 2, the preset triggering condition of smart contract 1 is condition a, and the condition a is to determine whether the dispatching center constructs an injected carbon flow rate sum column matrix $R_G$ of generator sets; preset rule a is: to respond to that a is to calculate the sum $R_{Gj}$ of injected active power on the basis of the master chain node, and upload same to the dispatching center;
the preset triggering condition of smart contract 2 is condition b, wherein condition b is that the dispatching center constructs an output power distribution matrix $P'_B$ of a branch, and a power flow proportion distribution matrix $S_r$ of the branch; preset rule b is: to respond to that b is to construct $P'_B$ and the power flow proportion distribution matrix $S_r$ of the branch through a network topology structure on the basis of the master chain node, and upload same to the dispatching center;
the preset triggering condition of smart contract 3 is condition c, and condition c is to calculate the carbon flow rate of the master chain node by the master chain node; preset rule c is: to respond to that c is to calculate the carbon flow rate of each master chain node on the basis of the master chain node;
the preset triggering condition of smart contract 4 is condition d, and condition d is to calculate a carbon flow rate of the branch connected to the master chain node by the master chain node; preset rule d is: to respond to that d is to calculate carbon flow rates at a head end of an output branch and at a tail end of an input branch of the master chain node on the basis of the master chain node, and calculate a carbon flow rate of a transmission loss of the branch connected to each master chain node; and
the preset triggering condition of smart contract 5 is condition e, and condition e is to calculate a carbon flow rate of an output load of the master chain node; and preset rule e is: to calculate a carbon flow rate of the output load on the basis of the output load of the master chain node.

* * * * *